(12) United States Patent
Park

(10) Patent No.: US 10,048,791 B2
(45) Date of Patent: Aug. 14, 2018

(54) IMAGE PROCESSING DEVICE AND METHOD FOR DISPLAYING A FORCE INPUT OF A REMOTE CONTROLLER WITH THREE DIMENSIONAL IMAGE IN THE SAME

(71) Applicant: HUMAX CO., LTD., Yongin (KR)

(72) Inventor: Sung Heum Park, Yongin (KR)

(73) Assignee: HUMAX CO., LTD., Yongin (KR)

( * ) Notice: Subject to any disclaimer, the term of this patent is extended or adjusted under 35 U.S.C. 154(b) by 70 days.

(21) Appl. No.: 15/254,907

(22) Filed: Sep. 1, 2016

(65) Prior Publication Data

US 2017/0300158 A1 Oct. 19, 2017

(30) Foreign Application Priority Data

Apr. 19, 2016 (KR) ........................ 10-2016-0047484

(51) Int. Cl.
*G06F 3/041* (2006.01)
*G06T 15/00* (2011.01)
*H04N 21/422* (2011.01)
*H04N 5/44* (2011.01)
*H04N 21/41* (2011.01)
(Continued)

(52) U.S. Cl.
CPC ............. *G06F 3/0414* (2013.01); *G06F 3/02* (2013.01); *G06F 3/0338* (2013.01); *G06F 3/04815* (2013.01); *G06F 3/04847* (2013.01); *G06F 3/04883* (2013.01); *G06T 15/00* (2013.01); *H04N 5/4403* (2013.01); *H04N 21/4131* (2013.01); *H04N 21/42201* (2013.01);
*H04N 21/42224* (2013.01); *H04N 21/431* (2013.01); *H04N 21/816* (2013.01); *G06F 3/016* (2013.01); *G06F 2203/0384* (2013.01);
(Continued)

(58) Field of Classification Search
None
See application file for complete search history.

(56) References Cited

U.S. PATENT DOCUMENTS 6,518,951 B1 * 2/2003 Keyson ................... A63F 13/10
345/156
2008/0117175 A1 * 5/2008 Linjama ................. G06F 3/016
345/173

(Continued)

FOREIGN PATENT DOCUMENTS

KR 10-2011-0107069 A 9/2011
KR 10-2014-0034612 A 3/2014
KR 10-2015-0051769 A 5/2015

*Primary Examiner* — James A Thompson

(57) ABSTRACT

An image processing device and a method for displaying a force input of a remote controller with a three dimensional image are disclosed. The image processing device comprises a receiving unit for receiving a control signal including information concerning a normal input or a force input to a key of a remote controller, and a processor for outputting information concerning a three dimensional imaginary entity for notifying of the force input when the control signal including the information concerning the force input is received, and removing the three dimensional imaginary entity when an input to the key of the remote controller is changed to the normal input while the force input remains. The three dimensional imaginary entity for notifying of the force input exists, a three dimensional imaginary entity for notifying of the normal input does not exist.

20 Claims, 10 Drawing Sheets

(51) Int. Cl.
  *H04N 21/431* (2011.01)
  *H04N 21/81* (2011.01)
  *G06F 3/0484* (2013.01)
  *G06F 3/02* (2006.01)
  *G06F 3/0338* (2013.01)
  *G06F 3/0481* (2013.01)
  *G06F 3/0488* (2013.01)
  *G06F 3/01* (2006.01)

(52) U.S. Cl.
  CPC ... *G08C 2201/32* (2013.01); *H04N 2005/441* (2013.01); *H04N 2005/4432* (2013.01)

(56) References Cited

U.S. PATENT DOCUMENTS

| | | | | |
|---|---|---|---|---|
| 2011/0210926 A1* | 9/2011 | Pasquero | ............... | G06F 3/016 345/173 |
| 2012/0065784 A1* | 3/2012 | Feldman | ............... | G06F 3/016 700/280 |
| 2015/0362995 A1* | 12/2015 | Norieda | ............... | G08B 6/00 340/407.2 |
| 2017/0031503 A1* | 2/2017 | Rosenberg | ............. | G06F 3/017 |

* cited by examiner

IMAGE PROCESSING DEVICE AND METHOD FOR DISPLAYING A FORCE INPUT OF A REMOTE CONTROLLER WITH THREE DIMENSIONAL IMAGE IN THE SAME

PRIORITY

This application claims priority under 35 U.S.C. § 119(a) to a Korean patent application filed on Apr. 19, 2016 in the Korean Intellectual Property Office and assigned Serial No. 10-2016-0047484, the entire disclosure of which is incorporated herein by reference.

BACKGROUND

1. Field of the Invention

The present disclosure relates to an image processing device and a method for displaying a force input of a remote controller with a three dimensional image in the same.

2. Description of the Related Art

A set-top box is connected to a television, converts properly a video signal and a voice signal received from an external device and displays an image corresponding to the converted video and voice signal through the television.

The set-top box receives an IPTV signal, a cable TV signal, a satellite TV signal or a general signal for broadcasting, and the set-top box displays the received signal on the television.

The set-top box generally interoperates with a wired or wireless controller. A user remotely controls the set-top box with the remote controller.

Functions of the set-top box or the television are diversified as types of contents and services provided from an IPTV, a cable TV or a satellite TV have been diversified. The number of buttons or keys in the remote controller controlling the set-top box or the television has increased due to the diversification of the functions.

It is preferable to provide various contents and services to the user, but the user need to know a function of each button in the remote controller in order to fully enjoy the various contents and services provided.

It becomes difficult for the user to control the remote controller with keeping the user's eyes toward the television (blind control) because the remote controller has lots of buttons or keys. Additionally, there are many factors distracting user's view when the user controls the remote controller. For example, the user should look at the remote controller and select a relevant button whenever the user wants to properly control the remote controller.

A demand for a remote controller having few or no button has been on the rise. Since a conventional remote controller does not satisfy such demand, a system and method for controlling the remote controller having few or not button is needed while allowing the user to enjoy a variety of contents and services. With the remote controller having few or no button, the user may easily figure out how to use the remote controller and it also enables the user to perform the blind control when using the remote controller.

SUMMARY

The invention has been made to address at least the disadvantages and problems described above, and to provide at least the advantage described below. An aspect of the invention provides an image processing device for providing a feedback by outputting a change of an input of a remote controller with a three dimensional imaginary entity according to a sensing level corresponding to an input to a key of the remote controller in a media system and a method for displaying a force input of the remote controller with a three dimensional image in the same.

According to one embodiment of the invention, an image processing device comprises a receiving unit configured to receive a control signal including information concerning a normal input or a force input applied to a key of a remote controller; and a processor configured to output information concerning a three dimensional imaginary entity for notifying of the force input when the control signal including the information concerning the force input is received, and remove the three dimensional imaginary entity when an input to the key of the remote controller is changed to the normal input while the force input remains. Here, the three dimensional imaginary entity for notifying of the force input exists, a three dimensional imaginary entity for notifying of the normal input does not exist, and the force input means an input applied to the key of the remote controller with higher pressure or wider area than a pressure or an area of the normal input.

According to another embodiment of the invention, an image processing device comprises a receiving unit configured to receive a control signal including information concerning a normal input or a force input applied to a key of a remote controller; and a processor configured to control to output information concerning a three dimensional imaginary entity for notifying of the force input when the control signal including the information concerning the force input is received, and control to display the three dimensional imaginary entity on another area according to a function corresponding to the force input. Here, at least one of a shape, a color, a size, a depth or a direction of the three dimensional imaginary entity is changed according to a level of the force input, and the force input means an input applied to the key of the remote controller with higher pressure or wider area than a pressure or an area of the normal input.

According to still another embodiment of the invention, an image processing device comprises a receiving unit configured to receive a control signal including information concerning a normal input or a force input applied to a key of a remote controller; and a processor configured to output information concerning a three dimensional imaginary entity for notifying of the force input when the control signal including the information concerning the force input is received. Here, the three dimensional imaginary entity is changed in response to a change of a level of the force input, the three dimensional imaginary entity for notifying of the force input exists, a three dimensional imaginary entity for notifying of the normal input does not exist, and the force input means an input applied to the key of the remote controller with higher pressure or wider area than a pressure or an area of the normal input.

According to still another embodiment of the invention, an image processing device comprises a receiving unit configured to receive a control signal including information concerning a normal input or a force input applied to a key of a remote controller; and a processor configured to control to output information concerning a three dimensional imaginary entity for notifying of the force input when the control signal including the information concerning the force input is received, and control to remove the three dimensional imaginary entity when an input to the key of the remote controller is changed to the normal input while the force input remains. Here, a three dimensional imaginary entity outputted when the force input is applied to a first key of the remote controller is different from a three dimensional imaginary entity outputted when the force input is applied to a second key of the remote controller, and the force input means an input applied to the key of the remote controller with higher pressure or wider area than a pressure or an area of the normal input.

According to still another embodiment of the invention, a method for displaying a force input of a remote controller with a three dimensional image in an image processing device comprises receiving a control signal including information concerning a normal input or a force input applied to a key of a remote controller; outputting information concerning a three dimensional imaginary entity for notifying of the force input when the control signal including the information concerning the force input is received; and removing the three dimensional imaginary entity when an input to the key of the remote controller is changed to the normal input while the force input remains. Here, the three dimensional imaginary entity for notifying of the force input exists, a three dimensional imaginary entity for notifying of the normal input does not exist, and the force input means an input applied to the key of the remote controller with higher pressure or wider area than a pressure or an area of the normal input.

The invention provides an image processing device and a method for displaying a force input of a remote controller with a three dimensional image in the same, thereby providing a feedback by outputting a change of an input of the remote controller with a three dimensional imaginary entity according to a sensing level corresponding to an input to a key of the remote controller.

As a result, a user may easily recognize the force input to a specific key of the remote controller, and so user's convenience may be enhanced.

BRIEF DESCRIPTION OF DRAWINGS

The aspects, features, advantages and embodiments of the invention will be more apparent from the following detailed description taken in conjunction with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

The invention relates to a media system including an image processing device and a remote controller for controlling the same. Here, the image processing device may be a display device, such as a television, for displaying visually various information or a set-top box for transmitting the information to the display device. That is, the image processing device is not limited as a specific device as long as it is a device for outputting visually data. For example, the image processing device may be the set-top box or the display device such as the television with function of the set-top box.

The remote controller of the invention includes at least one key, and may provide a control signal in accordance with a sensing level of a key controlled by a user to the image processing device. In this case, the image processing device may process different operations according to the sensing level of the key provided from the remote controller. Here, the key may be implemented with a physical button including a dome key or by software.

Hereinafter, various embodiments of the invention will be described in detail with reference to accompanying drawings.

Figure 1:
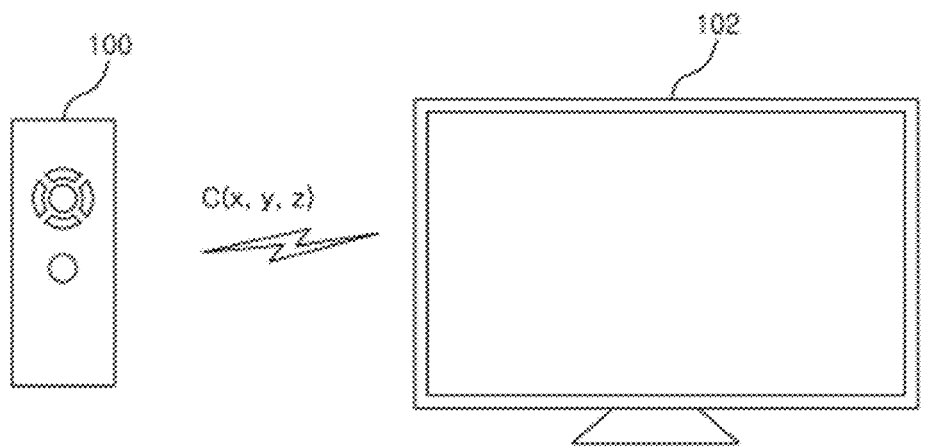
FIG. 1 is a view illustrating a media system according to one embodiment of the invention.
Figure 2:
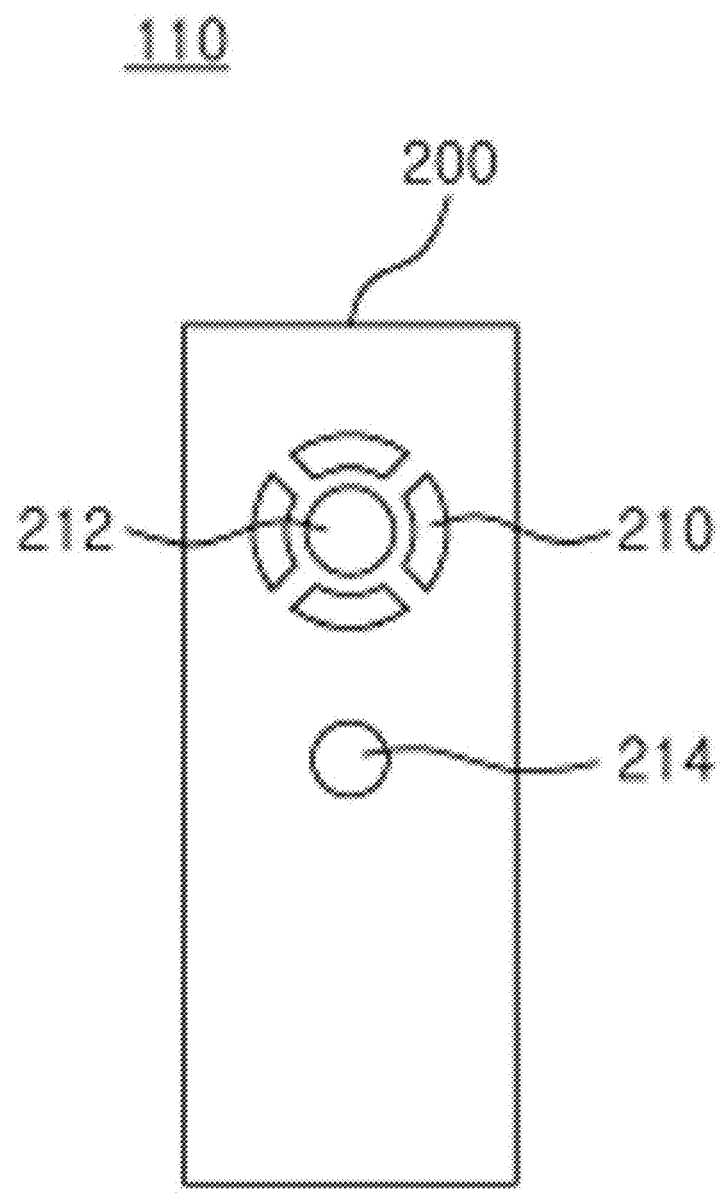
FIG. 2 is a view illustrating schematically a remote controller according to one embodiment of the invention.
Figure 3A:
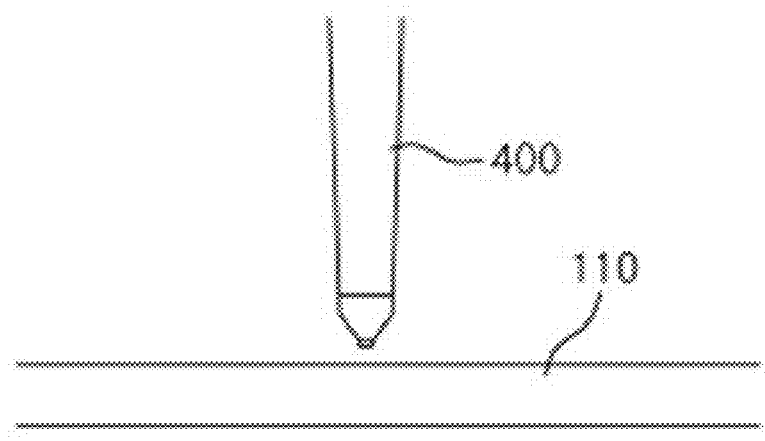
FIG. 3A to FIG. 3C are views illustrating a normal input and a force input.
Figure 3B:
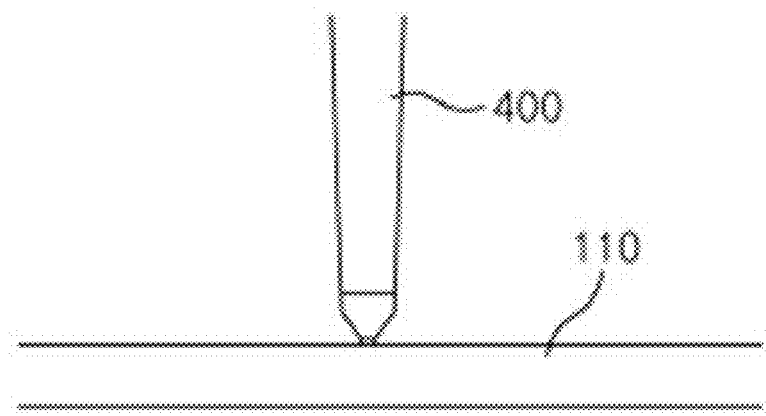
Figure 3C:
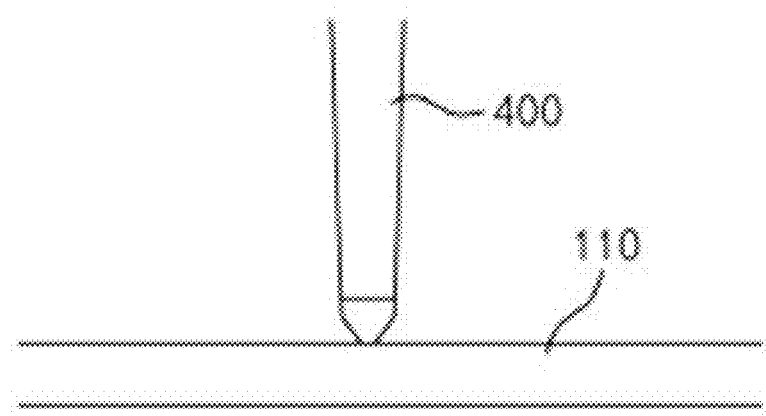
Figure 4:
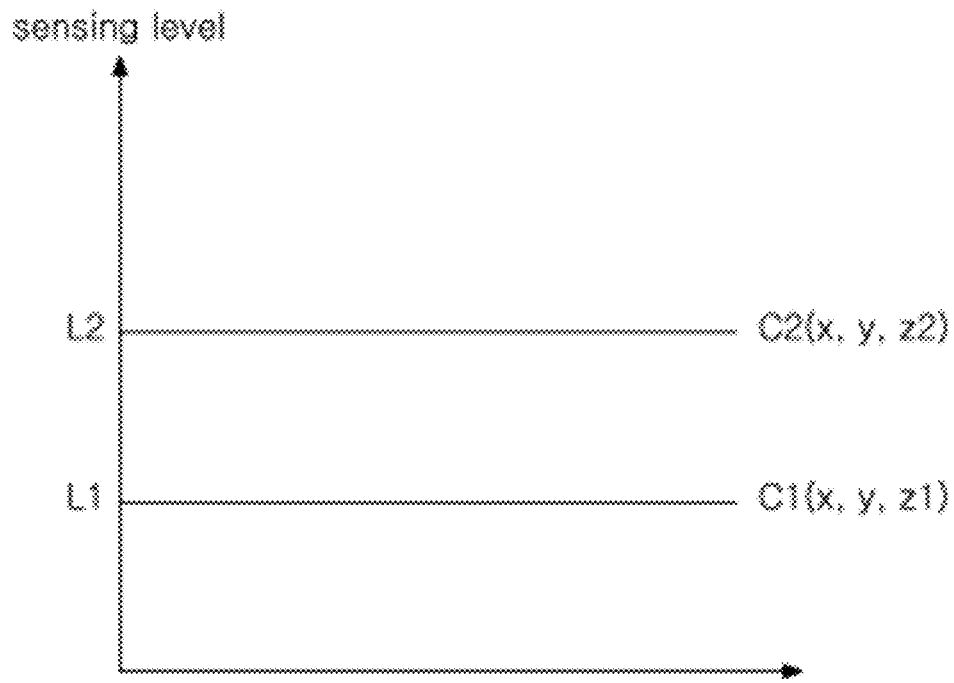
FIG. 4 is a view illustrating a sensing level corresponding to the normal input and the force input according to one embodiment of the invention.

FIG. 1 is a view illustrating a media system according to one embodiment of the invention, and FIG. 2 is a view illustrating schematically a remote controller according to one embodiment of the invention. FIG. 3A to FIG. 3C are views illustrating a normal input and a force input, and FIG. 4 is a view illustrating a sensing level corresponding to the normal input and the force input according to one embodiment of the invention.

In FIG. 1, the media system of the invention includes a remote controller 110 and an image processing device 120.

The remote controller 110 transmits a control signal in accordance with a control of a key by a user to the image processing device 120.

FIG. 2 shows an external appearance of the remote controller 110 according to one embodiment of the invention. In FIG. 2, the remote controller 110 may include a body 200 and plural keys formed on the body 200. Here, the keys formed on the body 200 may include a navigation key 210 having up, down, left, or right directional keys, a function key 214 for performing a variety of operations such as an esc key and a home key, etc., and a determination key 212 for performing an operation of an OK key, etc. On the other hand, various keys other than the navigation key 210, the determination key 212 and the function key 214 may exist in the remote controller 100. The various keys may be classified as the navigation key 210, the determination key 212 and the function key 214.

The remote controller 110 supports plural inputs about one key. Particularly, the remote controller 110 supports a normal input and a force input about at least one of its keys.

Here, the normal input means an input generally pressed by a user. For example, the normal input may be an input touched to a specific key of the remote controller 110 by a touch means 400 as shown in FIG. 3B under the condition that the touch means 400 does not touch the specific key of the remote controller 110 as shown in FIG. 3A.

The force input means an input to the key when the key is pressed or touched with higher pressure or a wider area than a pressure or an area of the normal input by the touch mean 400. The force input may be an input applied to the key as shown in FIG. 3C when the key is continuously touched or pressed with higher pressure or wider area after the touch means 400 touches or presses the key as shown in FIG. 3B under the condition that the touch means 400 does not touch or press a specific key as shown in FIG. 3A.

The sensing level differs according to the normal input or the force input though the user touches or presses the same key. As a result, the remote controller 110 may transmit different control signals to the image processing device 120 in response to the sensing level corresponding to the normal input or the force input, as shown in FIG. 4.

That is, the remote controller 110 may transmit different control signals to the image processing device 120 when the user applies the normal input to one key or when the user applies the force input to the one key. Accordingly, functions related to plural operations of the image processing device 120 may be set to at least one of the keys of the remote controller 110.

For example, the remote controller 110 may transmit different control signals to the image processing device 120 in response to the pressure or the area applied to a specific key of the remote controller 110 by using the touch means 400 such as a finger. Particularly, the remote controller 110 may transmit a first control signal including information concerning a specific key and a first sensing level corresponding to the normal input to the image processing device 120, when the user applies the normal input to the specific key of the remote controller 110. The remote controller 110 may transmit a second control signal including the information concerning the specific key and a second sensing level corresponding to the force input to the image processing device 120, when the user applies the force input to the specific key of the remote controller 110.

As a result, the image processing device 120 may perform different operations/functions according to the normal input or the force input, though the user touches or presses the same key.

As described above, the remote controller 110 may transmit the control signal including information concerning the specific key selected by the user and the sensing level corresponding to the pressure or the area applied to the specific key to the image processing device 120.

In one embodiment, the remote controller 110 may transmit the control signal including coordinate information to the image processing device 120.

For example, the information concerning the specific key selected by the user may be included in the control signal where it is expressed in a coordinate (x, y). The sensing level may be included in the control signal where it is expressed in a coordinate (z). That is, the remote controller 110 may transmit the control signal including a coordinate (x, y, z) to the image processing device 120.

Accordingly, the remote controller 110 may transmit a first control signal C1 including a coordinate (x, y, z1) to the image processing device 120, when the user presses or touches the specific key of the remote controller 110 with a first sensing level. The remote controller 110 may transmit a second control signal C2 including a coordinate (x, y, z2) to the image processing device 120, when the user presses or touches the specific key of the remote controller 110 with a second sensing level.

As a result, the image processing device 120 may perform different operations according to the sensing level, though the user presses or touches the same key.

For example, the image processing device 120 may control its internal function in response to the first sensing level, when the specific key of the remote controller 110 is pressed or touched with the first sensing level (i.e. when the sensing level included in the control signal corresponds to the sensing level in accordance with the normal input).

The image processing device 120 may control an external device in response to the second sensing level, when the sensing level corresponds to the second sensing level in accordance with the force input. As mentioned above, the image processing device 120 may be connected to one or more external devices through a home network.

Accordingly, the image processing device 120 may control the external device when the force input is applied to the specific key of the remote controller 110. That is, the image processing device 120 may transmit a control command for controlling the external device to the external device depending on information concerning the applied force input, and control the external device in response to the transmitted control command.

For example, it is assumed that the external device connected to the image processing device 120 through the home network is a lighting device. In the event that a function of the lighting device is matched with the force input to an up key and a down key of the remote controller 110, the image processing device 120 may control to turn on the lighting device when the force input is applied to the up key of the remote controller 110. Whereas, the image processing device 120 may control to turn off the lighting device when the force input is applied to the down key of the remote controller 110.

For another example, the image processing device 120 may change illumination of the lighting device according to the sensing level. For example, the image processing device 120 may control to increase the illumination of the lighting device in the event that the force input is applied to a left key of the remote controller 110. Whereas, the image processing device 120 may control to down the illumination of the lighting device in the event that the force input is applied to a right key of the remote controller 110.

For still another example, a plurality of external devices may be set to be matched with corresponding key while the external devices are connected to the image processing device 120 through the home network. In the event that the force input is applied to a specific key, the image processing device 120 may control an external device corresponding to the specific key in response to a control of the remote controller 110 after the force input is applied.

The user may register a specific key of exclusive remote controller for the image processing device 120 as a shortcut key while the external device, such as the lighting device, a gas circuit breaker, an air conditioner, an air cleaner, etc., is connected to the image processing device 120 through the home network. In this case, the user may select an external device to be controlled via the image processing device 120 by applying the force input to a preset key of the remote controller 110 corresponding to the external device, and then control the selected external device in response to a control of the key of the remote controller 110. Accordingly, the user need not to inconveniently control plural remote controllers, and may control the external device without actual moving while he is watching a television, etc. As a result, user's convenience may be enhanced.

For still another example, the image processing device 120 may perform different functions according to the sensing level depending on a control of a specific key of the remote controller 110. That is, the image processing device 120 may perform different operations according to whether an input applied to the specific key of the remote controller 110 corresponds to the normal input or the force input. For example, the image processing device 120 may output a program guide when the normal input is applied to the specific key, and output a VOD list when the force input is applied to the specific key.

In above embodiments, the sensing level corresponds to the pressure or the area applied to the key, but it may correspond to combination of plural information.

That is, the remote controller 110 may transmit a control signal including a sensing level corresponding to the pressure applied to the specific key by the user and a sensing level corresponding to the area applied to the specific key by the user to the image processing device 120. As a result, the control signal may be expressed in four dimensional coordinate (x, y, z, t).

In brief, one or more parameters may be set for the sensing level included in the control signal in accordance with a control of the key of the remote controller 110.

The remote controller 110 of the invention may control the image processing device 120 or the external device according to the sensing level of the specific key.

In the conventional remote controller, an input to the key includes only the normal input. As a result, only one operation is matched with one key, and thus the remote controller should include many keys. Accordingly, the remote controller has become complicated and caused inconvenience to users.

Whereas, the remote controller 110 of the invention provides the normal input and the force input having different sensing levels, and thus a plurality of operations not one operation may be matched with one key.

As a result, the remote controller 110 of the invention may have few or no key compared with the conventional remote controller, and so the structure of the remote controller 110 of the invention is simpler than that of the conventional remote controller. Accordingly, user's visibility is enhanced and user's convenience may be enhanced in controlling the remote controller 110.

Additionally, the remote controller 110 transmits the control signal including the coordinate information having information concerning the key in accordance with the control of a specific key and the sensing level corresponding to the control to the image processing device 120. In this case, the image processing device 120 may perform different operations according to software installed therein though the remote controller 110 transmits the same coordinate information to the image processing device 120.

Now referring to FIG. 1, the image processing device 120 is connected to at least one of the external devices through the home network, and the image processing device 120 or the external device may be controlled according to the sensing level of the remote controller 110 which is connected to the image processing device 120 through the wireless communication.

Figure 5:
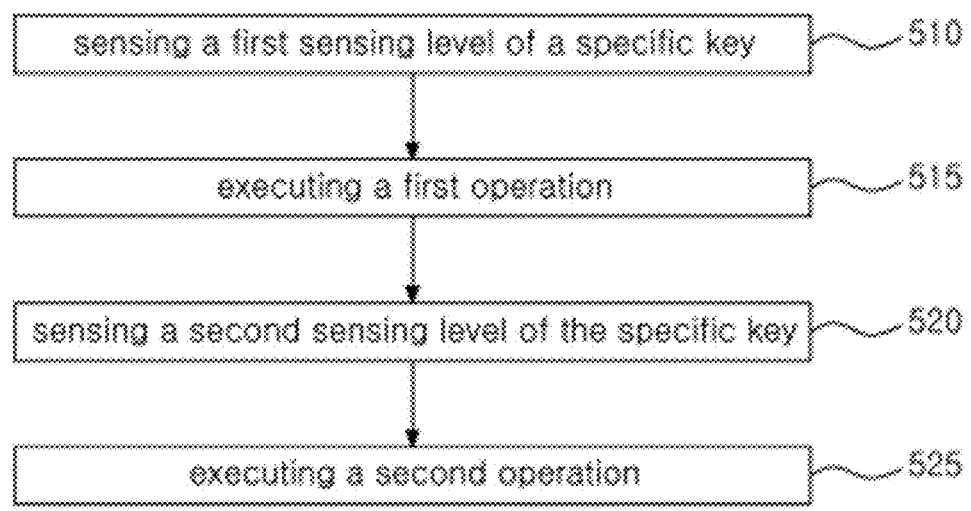
FIG. 5 is a flowchart illustrating schematically an operation of a media system according to one embodiment of the invention.

FIG. 5 is a flowchart illustrating schematically an operation of a media system according to one embodiment of the invention.

In a step of 510, the remote controller 110 transmits a first control signal $C(x, y, z1)$ including key information and a first sensing level in accordance with a normal input applied to a specific key to the image processing device 120, in the event that the user applies the normal input to the specific key of the remote controller 110.

As described above, the sensing level differs according to whether the input in accordance with the control of the key of the remote controller 110 corresponds to the normal input or the force input. Accordingly, the remote controller 110 may transmit the control signal including the sensing level, differing depending on at least one of the pressure or the area applied to the key though the user controls the same key, to the image processing device 120.

In a step of 515, the image processing device 120 may control its internal operation in response to the transmitted first control signal.

In a step of 520, the remote controller 110 transmits a second control signal $C(x, y, z2)$ including key information and a second sensing level to the image processing device 120, in the event that the user touches or presses the specific key with higher pressure or wider area.

In a step of 525, the image processing device 120 may control the external device in response to the transmitted second control signal.

Referring to FIG. 1 to FIG. 5, the image processing device 120 performs the different operations (functions) or controls the external device, according to the sensing level corresponding to the control of the key of the remote controller 110.

It is difficult for the user to recognize whether the normal input or the force input is applied to the key of the remote controller 110, in the event that a plurality of functions are set depending on the sensing level about the key of the remote controller 110. Accordingly, the image processing device 120 may visually output information concerning the force input so that the user can easily recognize the force input of the remote controller 110. Hereinafter, this will be described in detail.

Figure 6:
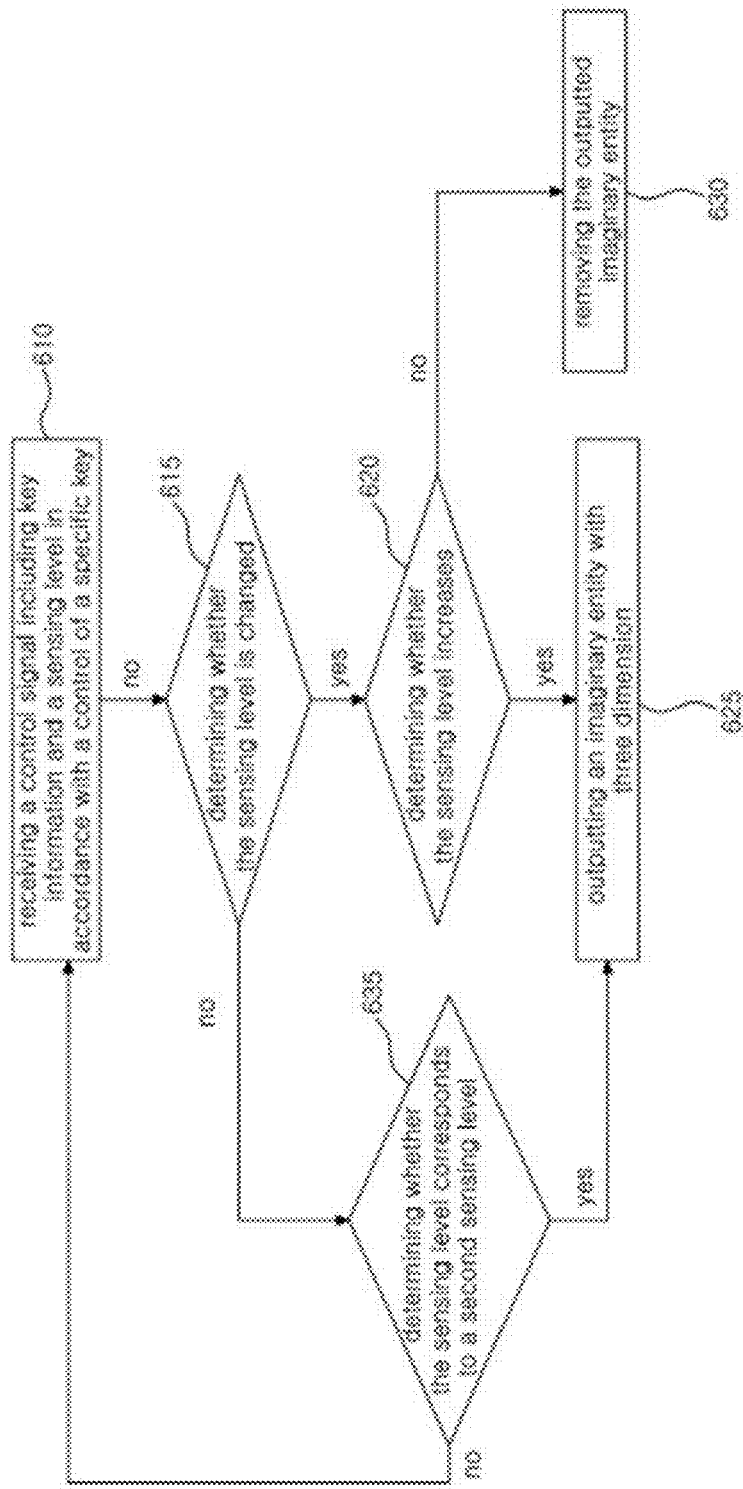
FIG. 6 is a flowchart illustrating a process of expressing the force input of the remote controller in a three dimensional image in the image processing device according to one embodiment of the invention.
Figure 7A:
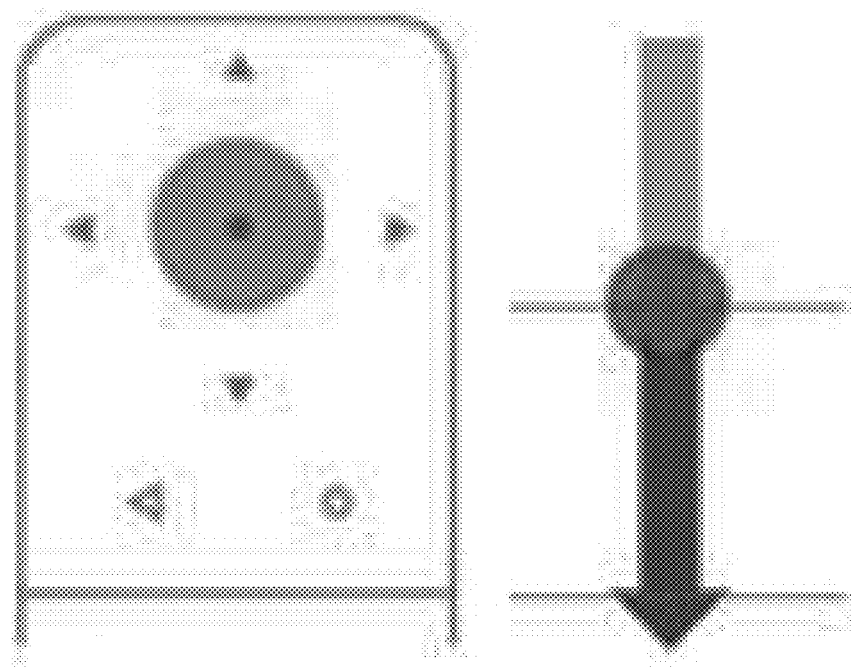
FIG. 7A and FIG. 7B are views illustrating a control of the key in the remote controller according to one embodiment of the invention.
Figure 7B:
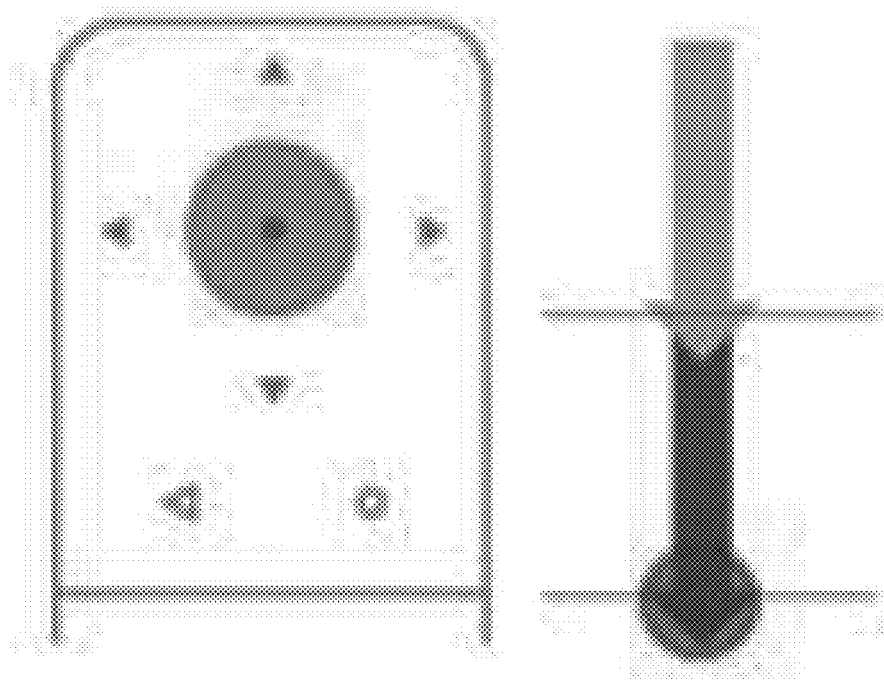
Figure 8:
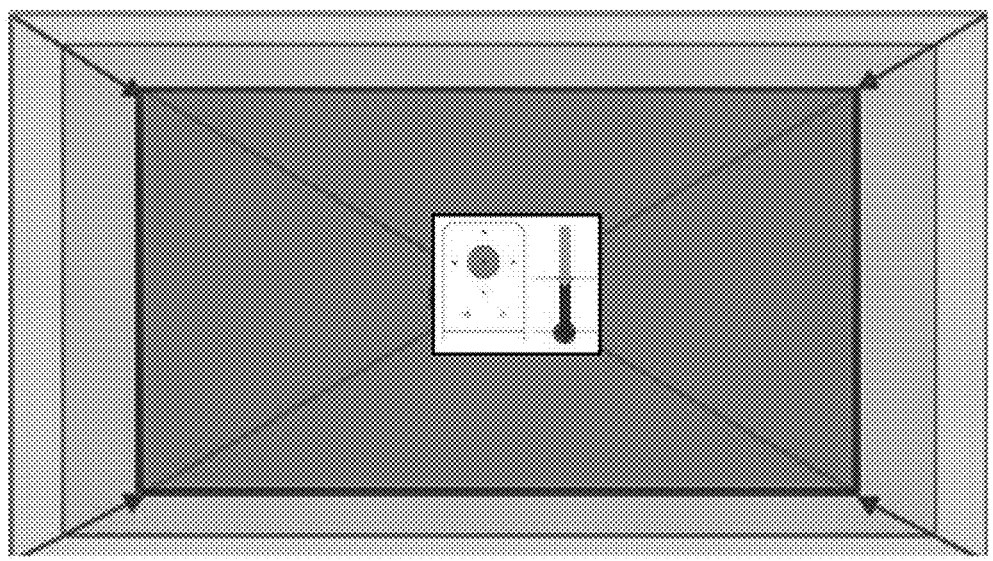
FIG. 8 and FIG. 9 are views illustrating an output of an imaginary entity according to one embodiment of the invention.
Figure 9:
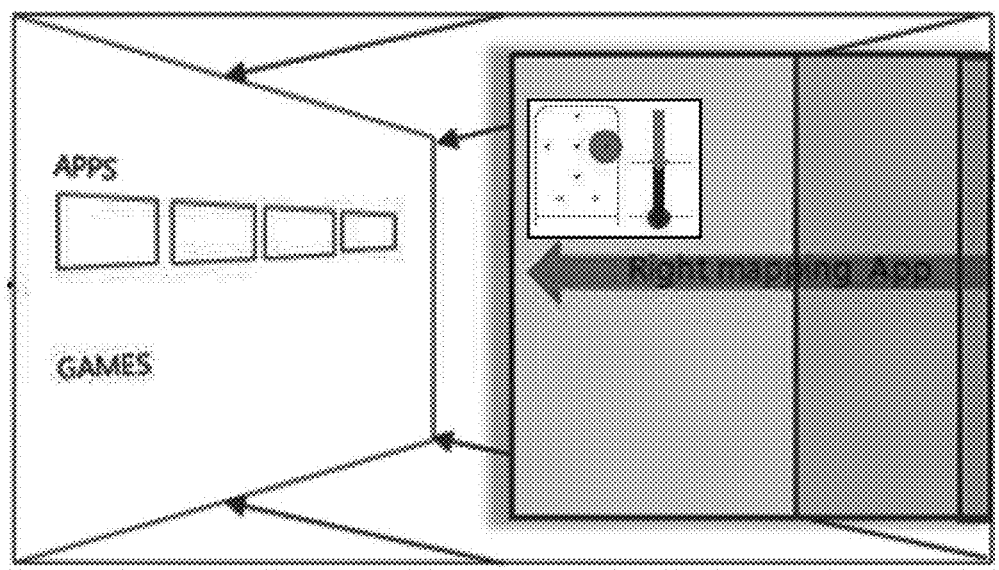

FIG. 6 is a flowchart illustrating a process of expressing the force input of the remote controller in a three dimensional image in the image processing device according to one embodiment of the invention. FIG. 7A and FIG. 7B are views illustrating a control of the key in the remote controller according to one embodiment of the invention. FIG. 8 and FIG. 9 are views illustrating an output of an imaginary entity according to one embodiment of the invention.

In a step of 610, the image processing device 120 receives a control signal in accordance with a control of a specific key from the remote controller 110. Here, the control signal includes key information in accordance with the control of the specific key of the remote controller 110 and a sensing level corresponding to at least one the pressure or the area applied to the specific key.

In a step of 615, the image processing device 120 determines whether or not the sensing level about the specific key is changed.

In a step of 620, the image processing device 120 determines whether or not the sensing level increases if the sensing level is changed.

In a step of 625, the image processing device 120 outputs a three dimensional imaginary entity for notifying that the force input is applied to the specific key of the remote controller 110 in the event that the sensing level increases.

However, in a step of 630, the image processing device 120 removes the outputted three dimensional imaginary entity in the event that the sensing level decreases.

It is assumed that the user applies the normal input to the specific key of the remote controller 110 as shown in FIG. 7A and then he sequentially applies the force input to the specific key without a releasing operation as shown in FIG. 7B.

In this case, a value of the sensing level increases, and a difference of the sensing level and the increased sensing level may be a positive number. In the event that the value of the sensing level increases, the image processing device 120 determines that the sensing level is changed to increase.

It is assumed that the normal input is again applied to the specific key of the remote controller 110 without a releasing operation while the force input is applied to the specific key. In this case, the value of the sensing level gets down, and the image processing device 120 determines that the sensing level is changed to down.

In the event that the sensing level is changed to down, i.e. the normal input is again applied to the specific key without the releasing operation while the force input is applied to the specific key, the image processing device 120 may remove the three dimensional imaginary entity which is being outputted in response to the force input.

The image processing device 120 may output the three dimensional imaginary entity for notifying of the force input to the user only when the force input is applied to the specific key of the remote controller 110.

In the event that it is determined through the step of 615 that the sensing level is not changed, the image processing device 120 determines whether or not the sensing level corresponds to a second sensing level in a step of 635.

The step of 610 is performed when it is determined that the sensing level does not correspond to the second sensing level.

However, the step of 630 is performed when the sensing level corresponds to the second sensing level.

Of course, in the event that the sensing level about the specific key of the remote controller 110 is not changed to increase but the force input is being kept, the image processing device 120 may output the three dimensional imaginary entity so that the user can recognize that the force input is being applied to the specific key.

For example, it is assumed that the user applies the force input to the specific key of the remote controller 110 while he is watching specific contents. The image processing device 120 may output the three dimensional imaginary entity after changing a size of a screen to notify applying of the force input to the user when the force input is applied to the specific key of the remote controller 110.

In one embodiment, the image processing device 120 may output the imaginary entity corresponding to the control of the remote controller 110 on a central part of the screen, change at least one of a shape, a color, a size, a direction or a depth of the outputted imaginary entity, and then output the changed imaginary entity in the three dimensions. As a result, the user may accurately recognize that the force input is applied to the specific key of the remote controller 110.

In another embodiment, the image processing device 120 may change the three dimensional imaginary entity in response to a change of a level of the force input, and then output the changed three dimensional imaginary entity. For example, the image processing device 120 may rotate (e.g. spin) the three dimensional imaginary entity based on a predetermined axis in response to the change of the level of the force input.

In the event that an input with higher level than a level of the normal input is sequentially applied to the specific key, the image processing device 120 may change in sequence a light and darkness or the size of the three dimensional imaginary entity. Accordingly, the user may recognize that the input to the specific key is shifted from the normal input to the force input.

In still another embodiment, in the event that the input to the key reaches a target input level corresponding to the force input, the image processing device 120 may execute a function corresponding to the force input. Here, if an input to the key of the remote controller 110 is released before the input reaches the target input level corresponding to the force input, the image processing device 120 may remove the three dimensional imaginary entity.

In still another embodiment, the image processing device 120 may differently output the three dimensional imaginary entity in response to identification of individual users for controlling the remote controller 110. The individual users may be identified by various methods. The individual users may be identified depending on their input (for example, a pressure or an area of the touching, etc.) for controlling the remote controller 110, or be identified according to a control of a specific key set to the remote controller 110. Of course, in the event that the remote controller 110 includes extra sensor, the individual users may be identified based on information sensed by the sensor.

In still another embodiment, the image processing device 120 may differently output the three dimensional imaginary entity according to a level of the force input. That is, the image processing device 120 may output only the three dimensional imaginary entity in the event that the level of the force input corresponds to a first force input level, and output together the three dimensional imaginary entity and a detailed function related to the operation of the force input in the event that the level of the force input corresponds to a second force input level.

In still another embodiment, the image processing device 120 may differently set a display area on which the three dimensional imaginary entity is outputted according to a function corresponding to the force input. For example, the three dimensional imaginary entity may be outputted on the display area for a PIP when the function corresponding to the force input is the PIP.

Moreover, the image processing device 120 may dynamically change the three dimensional imaginary entity according to the level of the force input.

In FIG. 8, the imaginary entity is an entity related to the remote controller 110. However, a type of the imaginary entity may be variously modified.

FIG. 9 is a view illustrating an three dimensional imaginary entity outputted when the force input is applied to one of the navigation keys of the remote controller.

In FIG. 8 and FIG. 9, the image processing device 120 may differently output the imaginary entity according to the key of the remote controller 110.

In short, the image processing device 120 may visually output the three dimensional imaginary entity so that the user can recognize a force input to a specific key of the remote controller 110, in the event that the force input is applied to the specific key with higher pressure or wider area without the releasing operation after a normal input is applied to the specific key. That is, the image processing device 120 may not output an imaginary entity for notifying the normal input to the specific key of the remote controller 110. Since the three dimensional imaginary entity for notifying only the force input of the remote controller 110 is outputted, the user may accurately recognize his force input applied to the key of the remote controller 110.

Figure 10:
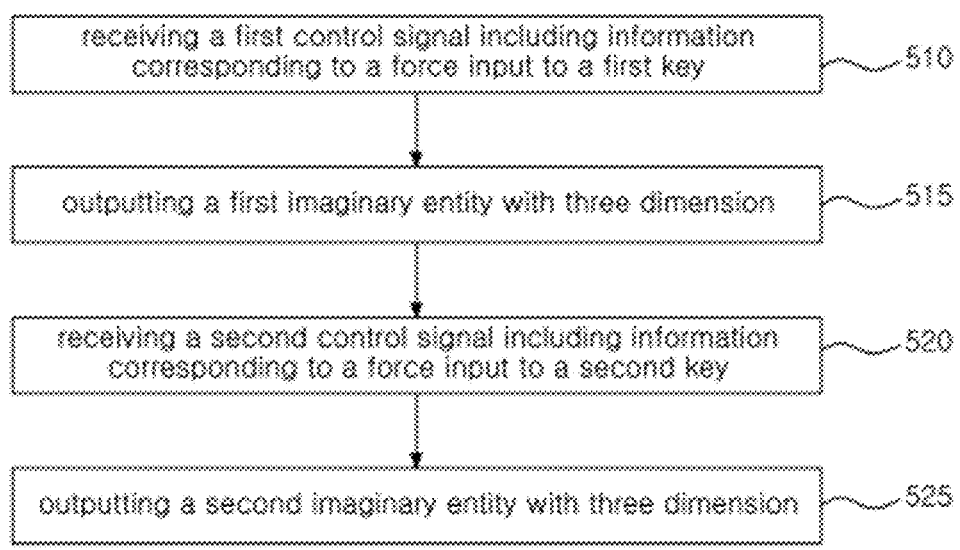
FIG. 10 is a flowchart illustrating a process of displaying the force input of the remote controller through a three dimensional image in the image processing device according to another embodiment of the invention.

FIG. 10 is a flowchart illustrating a process of displaying the force input of the remote controller through a three dimensional image in the image processing device according to another embodiment of the invention. FIG. 11A to FIG. 11D are views illustrating examples of outputting an imaginary entity corresponding to the force input according to another embodiment of the invention.

In a step of 1010, the image processing device 120 receives a first control signal including information corresponding to a force input to a first key from the remote controller 110.

In a step of 1015, the image processing device 120 outputs information concerning a first imaginary entity in response to the force input applied to the first key.

In a step of 1020, the image processing device 120 receives a second control signal including information corresponding to a force input to a second key from the remote controller 110.

In a step of 1025, the image processing device 120 outputs a second imaginary entity in response to the force input applied to the second key.

That is, the image processing device 120 may output different three dimensional imaginary entities according to the keys of the remote controller 110 to which the force input is applied.

In one embodiment, the image processing device 120 may differently output at least one of a shape, a color, a size, a depth or a direction of the three dimensional imaginary entity according to a level of the force input.

Accordingly, the user may accurately recognize the force input and a change of the level of the force input.

Figure 11A:
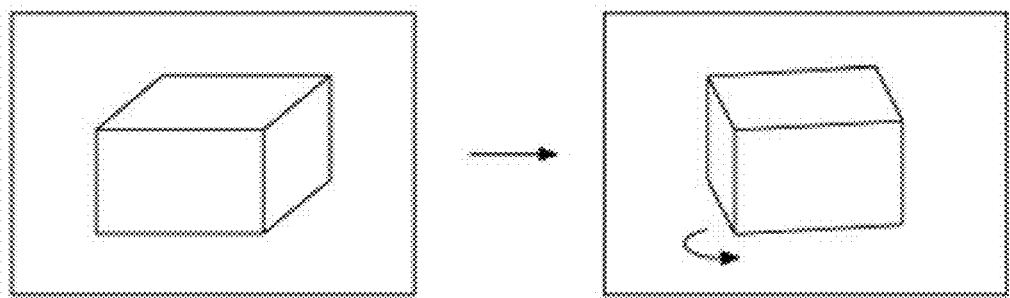
FIG. 11A to FIG. 11D are views illustrating examples of outputting an imaginary entity corresponding to the force input according to another embodiment of the invention.

In FIG. 11A to FIG. 11D, the imaginary entity has a shape of a cube. It is assumed that the force input is applied to the navigation key of the remote controller 110. As shown in FIG. 11A, the image processing device 120 may rotate the three dimensional imaginary entity in response to the force input applied to the navigation key.

Figure 11B:
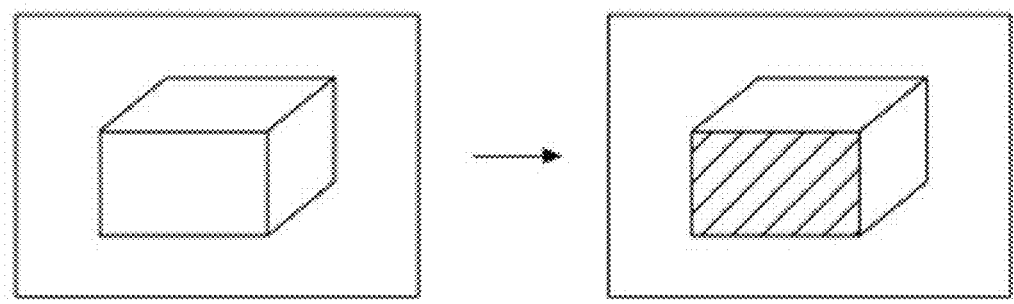

In one embodiment, the image processing device 120 may change the color of the three dimensional imaginary entity and output the changed three dimensional imaginary entity when the force input is applied to the determination key or the function key of the remote controller 110 as shown in FIG. 11B.

Figure 11C:
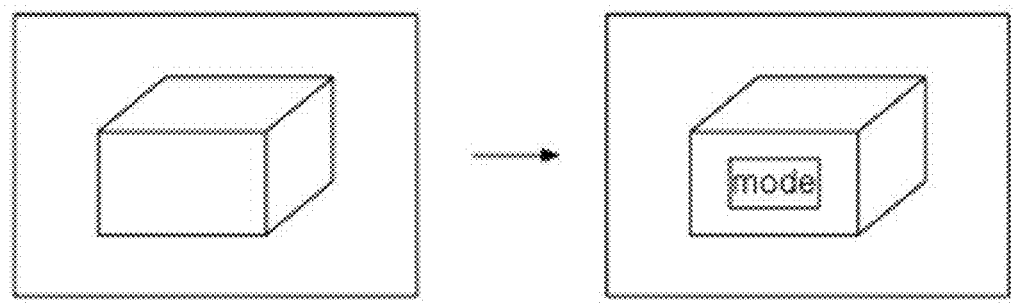

In another embodiment, in the event that a conversion of a mode is executed as the force input is applied to a specific key of the remote controller 110 as shown in FIG. 11C, the image processing device 120 may output information concerning the converted mode or information concerning an operation converted according to the force input with the three dimensional imaginary entity.

Figure 11D:
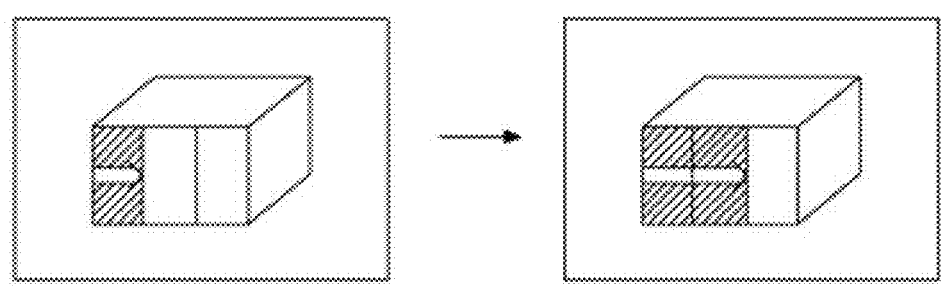

In still another embodiment, in the event that the level of the force input is divided into plural levels as shown in FIG. 11D, the image processing device 120 may change the three dimensional imaginary entity according to the level of the force input so that the user can accurately recognize the level of the force input.

In FIG. 11A to FIG. 11D, the color or the direction, etc. of the three dimensional imaginary entity is changed without a change of the shape of the three dimensional imaginary entity. However, the shape or the size of the three dimensional imaginary entity may be changed according to the key.

Figure 12:
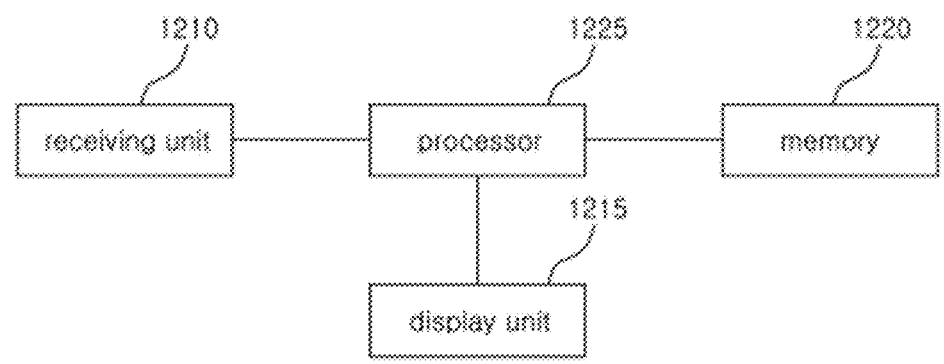
FIG. 12 is a view schematically the image processing device according to one embodiment of the invention.

FIG. 12 is a view schematically the image processing device according to one embodiment of the invention.

In FIG. 12, the image processing device 120 of the invention includes a receiving unit 1210, a display unit 1215, a memory 1220 and a processor 1225.

The receiving unit 1210 receives the control signal including the key information corresponding to the control of the specific key and the sensing level in accordance with at least one of the pressure or the area applied to the specific key.

The display unit 1215 visually outputs various information in response to control of the processor 1225. For example, the display unit 1215 may be a screen of a liquid crystal display.

The memory 1220 stores various applications or algorithms, etc. needed for outputting the three dimensional imaginary entity for notifying the force input to the specific key of the remote controller 110.

The processor 1225 controls internal elements (for example, the receiving unit 1210, the memory 1220, etc.) of the image processing device 120.

The processor 1225 may control the internal operation of the image processing device 120 or the external device according to the sensing level and the key information included in the control signal.

The processor may control to output the three dimensional imaginary entity for notifying of the force input to the user when the force input is applied to the specific key of the remote controller 110. Here, the processor 1225 may generate simultaneously a vibration or a sound with outputting the imaginary entity.

The processor 1225 may not output the imaginary entity though the force input is applied to the specific key of the remote controller 110, in the event that only one function is set to the specific key or the external device to be controlled is not set.

The processor may remove the outputted imaginary entity in the event that an input to the specific key of the remote controller 110 is changed to the normal input under remaining of the force input, while the imaginary entity is being outputted.

That is, the processor 1225 may control to output the three dimensional imaginary entity to notify the force input to the user, only when the force input is applied to the specific key of the remote controller 110. In addition, the outputted imaginary entity may have different shape, color and depth according to the controlled key.

Components in the embodiments described above can be easily understood from the perspective of processes. That is, each component can also be understood as an individual process. Likewise, processes in the embodiments described above can be easily understood from the perspective of components.

Also, the technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

DESCRIPTION OF REFERENCE NUMBERS

110: remote controller
120: image processing device

What is claimed is:

1. An image processing device, comprising:
   a receiving unit configured to receive a control signal including information concerning a normal input or a force input to a key of a remote controller; and
   a processor configured to output information concerning a three dimensional imaginary entity for notifying of the force input when the control signal including coordinate information corresponding to the force input applied to the key of the remote controller is received, and remove the three dimensional imaginary entity when an input to the key of the remote controller is changed to the normal input while the force input remains,
   wherein the three dimensional imaginary entity for notifying of the force input exists, a three dimensional imaginary entity for notifying of the normal input does not exist, and
   the force input means an input applied to the key of the remote controller with higher pressure or wider area than a pressure or an area of the normal input,
   wherein the processor executes a function corresponding to a level of the force input when a level of the input reaches a target input level corresponding to the level of the force input while the input is being sequentially applied with the level higher than the level of the normal input, and removes the three dimensional imaginary entity when the input of the remote controller is released before the level of the input reaches the target input level.

2. The image processing device of claim 1, wherein the processor changes at least one of a shape, a color, a size, a depth or a direction of the three dimensional imaginary entity according to a level of the force input, and outputs the changed three dimensional imaginary entity.

3. The image processing device of claim 1, wherein the processor differently outputs the three dimensional imaginary entity according to the key to which the force input is applied.

4. The image processing device of claim 1, wherein the processor simultaneously outputs information concerning at least one of a vibration or a sound along with outputting the information concerning the three dimensional imaginary entity.

5. The image processing device of claim 1, wherein the processor sequentially changes a light and darkness or a size of the three dimensional imaginary entity when an input is applied in sequence to the key with a level higher than a level of the normal input, and outputs the changed three dimensional imaginary entity.

6. The image processing device of claim 1, wherein the processor differently outputs the three dimensional imaginary entity in response to identifying an individual user via the remote controller.

7. The image processing device of claim 1, wherein the processor dynamically changes the three dimensional imaginary entity according to a level of the force input.

8. The image processing device of claim 1, wherein the processor outputs only the three dimensional imaginary entity when a level of the force input corresponds to a first force input level, and outputs a detailed function related to an operation corresponding to the force input with the three dimensional imaginary entity when the level of the force input corresponds to a second force input level.

9. An image processing device, comprising:
   a receiving unit configured to receive a control signal including information concerning a normal input or a force input applied to a key of a remote controller; and
   a processor configured to output information concerning a three dimensional imaginary entity for notifying of the force input when the control signal including coordinate information corresponding to the force input applied to the key of the remote controller is received, and display the three dimensional imaginary entity on another area according to a function corresponding to the force input,
   wherein at least one of a shape, a color, a size, a depth or a direction of the three dimensional imaginary entity is changed according to a level of the force input, and
   the force input means an input applied to the key of the remote controller with higher pressure or wider area than a pressure or an area of the normal input,
   wherein the processor executes a function corresponding to a level of the force input when a level of the input reaches a target input level corresponding to the level of the force input while the input is being sequentially applied with the level higher than the level of the normal input, and removes the three dimensional imaginary entity when the input of the remote controller is released before the level of the input reaches the target input level.

10. The image processing device of claim 9, wherein the processor outputs differently the three dimensional imaginary entity according to a key to which the force input is applied.

11. The image processing device of claim 9, wherein the processor removes the three dimensional imaginary entity when an input to the key of the remote controller is changed to the normal input while the force input remains.

12. An image processing device, comprising:
   a receiving unit configured to receive a control signal including information concerning a normal input or a force input applied to a key of a remote controller; and
   a processor configured to output information concerning a three dimensional imaginary entity for notifying of the force input when the control signal including coordinate information corresponding to the force input applied to the key of the remote controller is received,
   wherein the three dimensional imaginary entity is changed according to a change of a level of the force input, the three dimensional imaginary entity for notifying of the force input exists, a three dimensional imaginary entity for notifying of the normal input does not exist, and the force input means an input applied to the key of the remote controller with higher pressure or wider area than a pressure or an area of the normal input, wherein the processor executes a function corresponding to a level of the force input when a level of the input reaches a target input level corresponding to the level of the force input while the input is being sequentially applied with the level higher than the level of the normal input, and removes the three dimensional imaginary entity when the input of the remote controller is released before the level of the input reaches the target input level.

13. An image processing device, comprising:

a receiving unit configured to receive a control signal including information concerning a normal input or a force input applied to a key of a remote controller; and a processor configured to output information concerning a three dimensional imaginary entity for notifying of the force input when the control signal including coordinate information corresponding to the force input applied to the key of the remote controller is received, and remove the three dimensional imaginary entity when an input to the key of the remote controller is changed to the normal input while the force input remains, wherein a three dimensional imaginary entity outputted when the force input is applied to a first key of the remote controller is different from a three dimensional imaginary entity outputted when the force input is applied to a second key of the remote controller, and the force input means an input applied to the key of the remote controller with higher pressure or wider area than a pressure or an area of the normal input, wherein the processor executes a function corresponding to a level of the force input when a level of the input reaches a target input level corresponding to the level of the force input while the input is being sequentially applied with the level higher than the level of the normal input, and removes the three dimensional imaginary entity when the input of the remote controller is released before the level of the input reaches the target input level.

14. The image processing device of claim 13, wherein the three dimensional imaginary entity for notifying of the force input exists, a three dimensional imaginary entity for notifying of the normal input does not exist.

15. The image processing device of claim 13, wherein the processor changes at least one of a shape, a color, a size, a depth or a direction of the three dimensional imaginary entity according to a level of the force input and outputs the changed three dimensional imaginary entity.

16. A method for displaying a force input of a remote controller with a three dimensional image in an image processing device, the method comprising:

receiving a control signal including information concerning a normal input or a force input applied to a key of a remote controller;

outputting information concerning a three dimensional imaginary entity for notifying of the force input when the control signal including coordinate information corresponding to the force input applied to the key of the remote controller is received; and removing the three dimensional imaginary entity when an input to the key of the remote controller is changed to the normal input while the force input remains, wherein the three dimensional imaginary entity for notifying of the force input exists, a three dimensional imaginary entity for notifying of the normal input does not exist, and the force input means an input applied to the key of the remote controller with higher pressure or wider area than a pressure or an area of the normal input, wherein a function corresponding to the force input is executed when input level reaches a target input level corresponding to the force input while the input is being sequentially applied with the level higher than the level of the normal input, and the three dimensional imaginary entity is removed when the input of the remote controller is released before the input level reaches the target input level.

17. The method of claim 16, wherein a processor changes at least one of a shape, a color, a size, a depth or a direction of the three dimensional imaginary entity according to level of the force input, and outputs the changed three dimensional imaginary entity.

18. The method of claim 16, wherein a processor differently outputs the three dimensional imaginary entity according to the key to which the force input is applied.

19. The method of claim 16, wherein a processor sequentially changes a light and darkness or a size of the three dimensional imaginary entity when an input is applied in sequence to the key with a level higher than a level of the normal input, and outputs the changed three dimensional imaginary entity.

20. The method of claim 16, wherein a processor outputs only the three dimensional imaginary entity when a level of the force input corresponds to a first force input level, and outputs a detailed function related to an operation corresponding to the force input with the three dimensional imaginary entity when the level of the force input corresponds to a second force input level.

* * * * *